United States Patent
Horng et al.

(10) Patent No.: US 7,044,721 B2
(45) Date of Patent: May 16, 2006

(54) FAN CASING WITH BUILT-IN MOTOR POLES

(75) Inventors: Alex Horng, Kaohsiung (TW); Yin-Rong Horng, Kaohsiung (TW); Ching-Sheng Hong, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 384 days.

(21) Appl. No.: 10/442,299

(22) Filed: May 21, 2003

(65) Prior Publication Data

US 2004/0191095 A1    Sep. 30, 2004

(30) Foreign Application Priority Data

Mar. 31, 2003   (TW) .............................. 92107454 A

(51) Int. Cl.
   *F04B 17/00*  (2006.01)
(52) U.S. Cl. .............................. 417/423.7; 417/423.14
(58) Field of Classification Search ............. 417/423.7, 417/423.3, 423.14; 361/695; 310/257
See application file for complete search history.

(56) References Cited

U.S. PATENT DOCUMENTS

| | | | | |
|---|---|---|---|---|
| 3,448,306 A | * | 6/1969 | Murray ........................ | 310/83 |
| 3,558,940 A | * | 1/1971 | Chestnut et al. .............. | 310/41 |
| 4,059,780 A | * | 11/1977 | Mazuir ........................ | 310/164 |
| 5,176,509 A | * | 1/1993 | Schmider et al. ......... | 417/423.7 |
| 5,831,359 A | * | 11/1998 | Jeske ........................ | 310/68 B |
| 5,879,141 A | * | 3/1999 | Yokozawa et al. ....... | 417/423.7 |
| 6,239,971 B1 | * | 5/2001 | Yu et al. ..................... | 361/695 |
| 6,270,325 B1 | * | 8/2001 | Hsieh ..................... | 417/423.12 |
| 6,525,938 B1 | * | 2/2003 | Chen .......................... | 361/695 |

FOREIGN PATENT DOCUMENTS

JP          58-127549          *   7/1983

* cited by examiner

*Primary Examiner*—Charles G. Freay
(74) *Attorney, Agent, or Firm*—Bacon & Thomas, PLLC

(57) ABSTRACT

A casing for a heat-dissipating fan includes a bottom board and a plurality of sidewalls extending from the bottom board. The bottom board and the sidewalls are integrally formed by punching a magnetically conductive plate. The bottom board includes a base on which a stator having a coil assembly is mounted. An axial hole is defined in the base of the bottom board, and a bearing is mounted in the axial hole for rotatably holding a shaft of a rotor. Magnetic pole faces are formed on the base of the bottom board by punching the base of the bottom board. The magnetic pole faces surround the axial hole and are adjacent to the coil assembly of the stator.

28 Claims, 8 Drawing Sheets

FAN CASING WITH BUILT-IN MOTOR POLES

BACKGROUND OF THE INVENTION

1. Field of the Invention

The present invention relates to an integrally formed casing for a heat-dissipating fan. In particular, the present invention relates to a heat-dissipating fan casing that is integrally formed by means of punching a magnetically conductive plate to reduce the number of parts of the casing and the stator, to reduce an overall thickness, and to simplify the structure of the heat-dissipating fan.

2. Description of Related Art

FIG. 8 of the drawings illustrates a conventional heat-dissipating fan with an axial winding. The heat-dissipating fan includes a casing 10, a coil assembly 20, a rotor 30, a circuit board 40, a metal axle tube 50, an upper pole plate 60, and a lower pole plate 70. The casing 10 includes a plurality of ribs 11 connected to a base 12 on which the metal axle tube 50 is fixed. The circuit board 40 and a bobbin 21 of the coil assembly 20 are mounted around the metal axle tube 50. The upper and lower pole plates 60,70 are mounted to two sides of the bobbin 21 and each includes a plurality of pole arms that extend to form a plurality of magnetic pole faces 61. The rotor 30 includes a shaft 31 rotatably extended through a bearing (not shown) mounted in the metal axle tube 50. A change in the polarities of the magnetic pole faces 61 drives the rotor 30 to turn, thereby generating air current by the blades 32 on the rotor 30. However, there are too many parts of the stator (including the coil assembly 20, the bobbin 21, the circuit board 40, the metal axle tube 50, and the upper and lower pole plates 60,70. The parts of the stator are stacked on the base 12 and thus increase an overall thickness and overall volume of the heat-dissipating fan. As a result, such a heat-dissipating fan cannot be used in notebook type computers as well as other delicate electronic devices.

OBJECTS OF THE INVENTION

The object of the present invention is to provide a heat-dissipating fan casing that is integrally formed by means of punching a magnetically conductive plate to reduce the number of parts of the casing and the stator, to simplify the structure of the heat-dissipating fan, and to reduce the manufacture cost.

Another object of the present invention is to a heat-dissipating fan casing that is integrally formed by means of punching a magnetically conductive plate, wherein the base and the magnetic pole faces that are formed by means of punching are used to mount a coil assembly and a circuit board for a stator. Thus, the parts of the stator are not all stacked in an axial direction, thereby reducing the overall thickness of the heat-dissipating fan.

SUMMARY OF THE INVENTION

To achieve the aforementioned objects, the present invention provides a casing for a heat-dissipating fan, wherein the casing includes a bottom board and a plurality of sidewalls extending from the bottom board. The bottom board and the sidewalls are integrally formed by means of punching a magnetically conductive plate. The bottom board includes a base on which a stator having a coil assembly is mounted. An axial hole is defined in the base of the bottom board, and a bearing is mounted in the axial hole for rotatably holding a shaft of a rotor. A plurality of magnetic pole faces are formed on the base of the bottom board by means of punching the base of the bottom board. The magnetic pole faces surround the axial hole and are adjacent to the coil assembly of the stator.

Other objects, advantages and novel features of this invention will become more apparent from the following detailed description when taken in conjunction with the accompanying drawings.

DETAILED DESCRIPTION OF THE PREFERRED EMBODIMENTS

Figure 1:
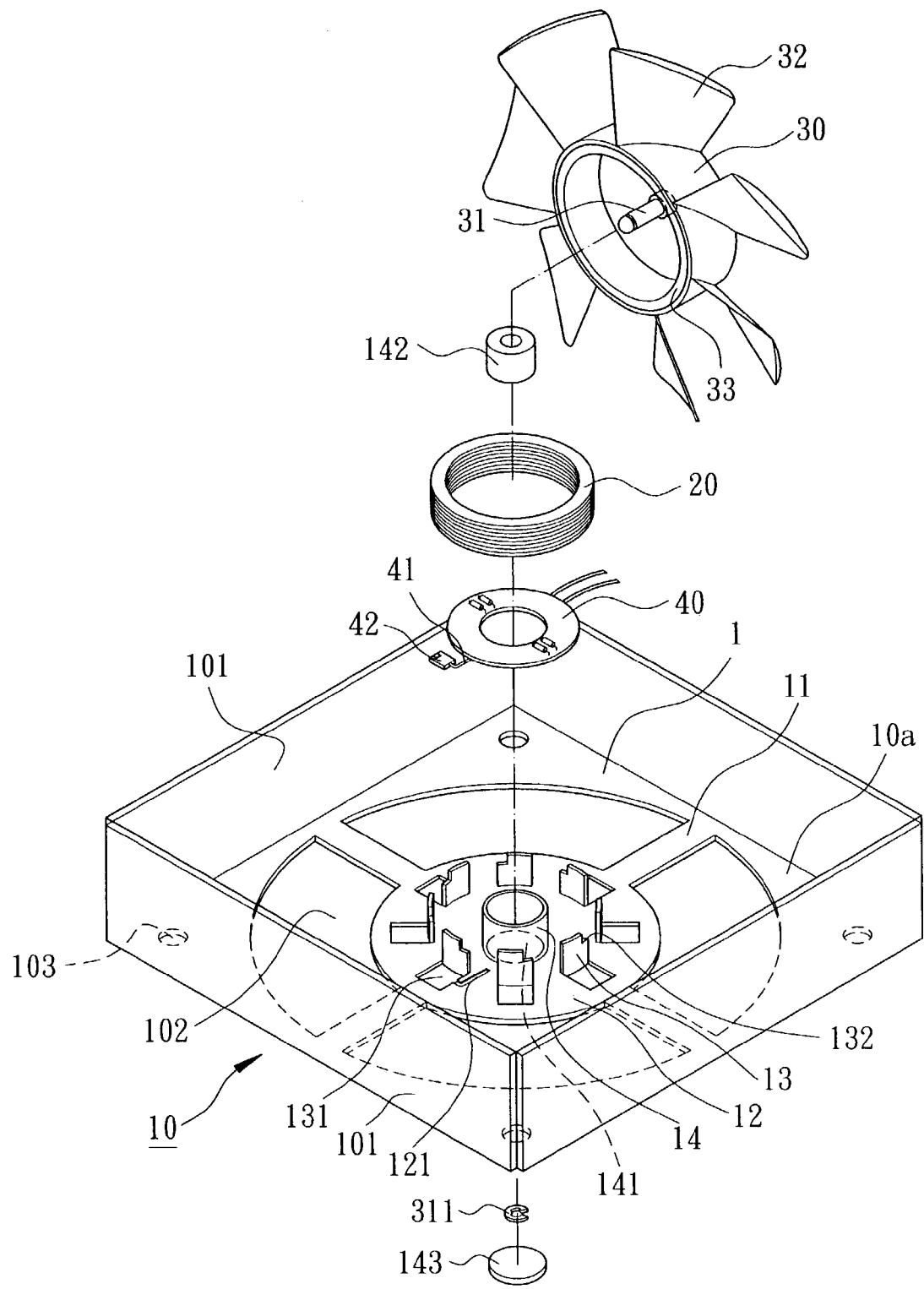
FIG. 1 is an exploded perspective view of a heat-dissipating fan with a first embodiment of a casing in accordance with the present invention.

The present invention is now to be described hereinafter in detail, in which the same reference numerals are used for the same parts as those in the prior art.

Figure 2:
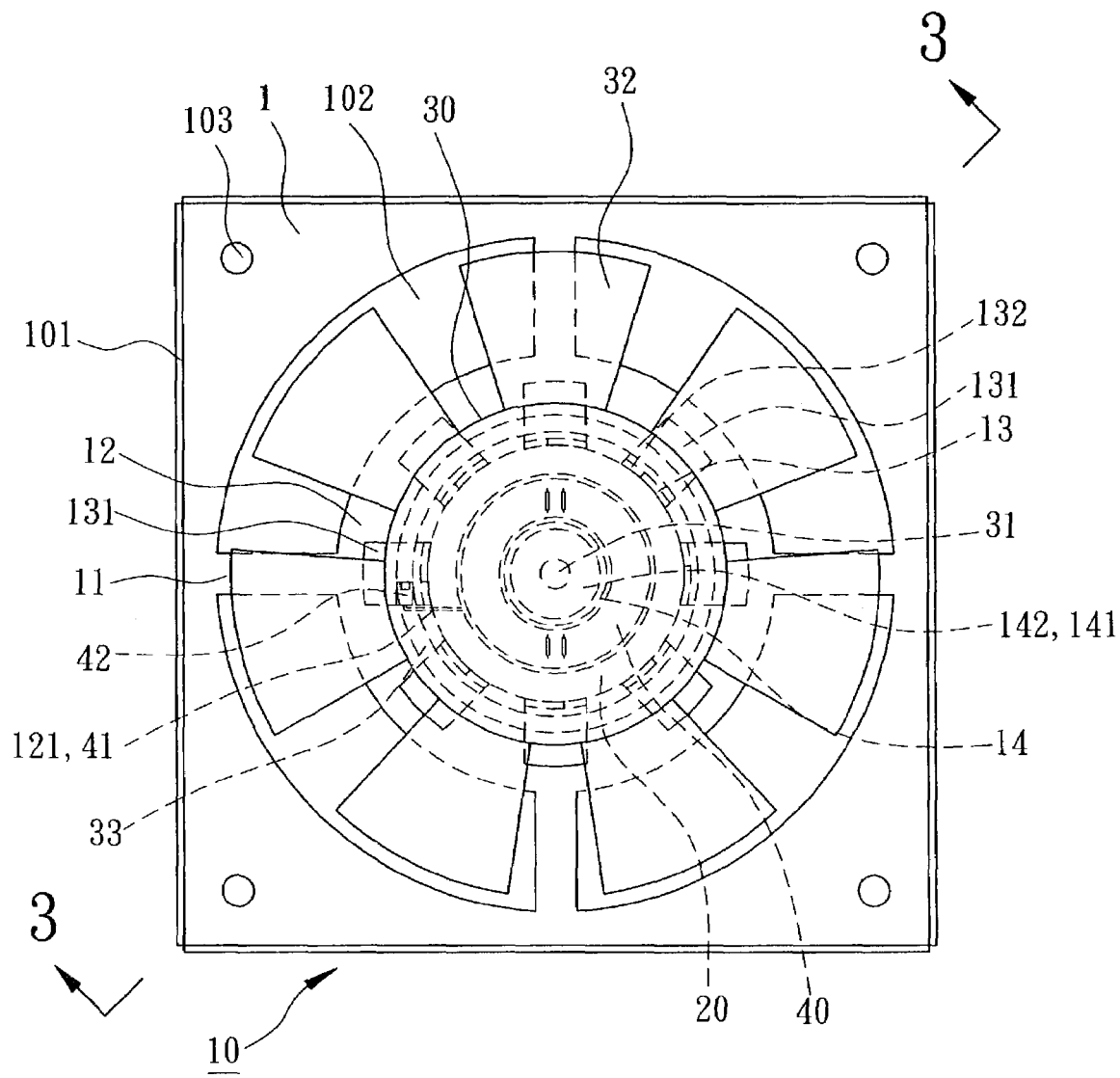
FIG. 2 is a top view of the heat-dissipating fan in FIG. 1.
Figure 3:
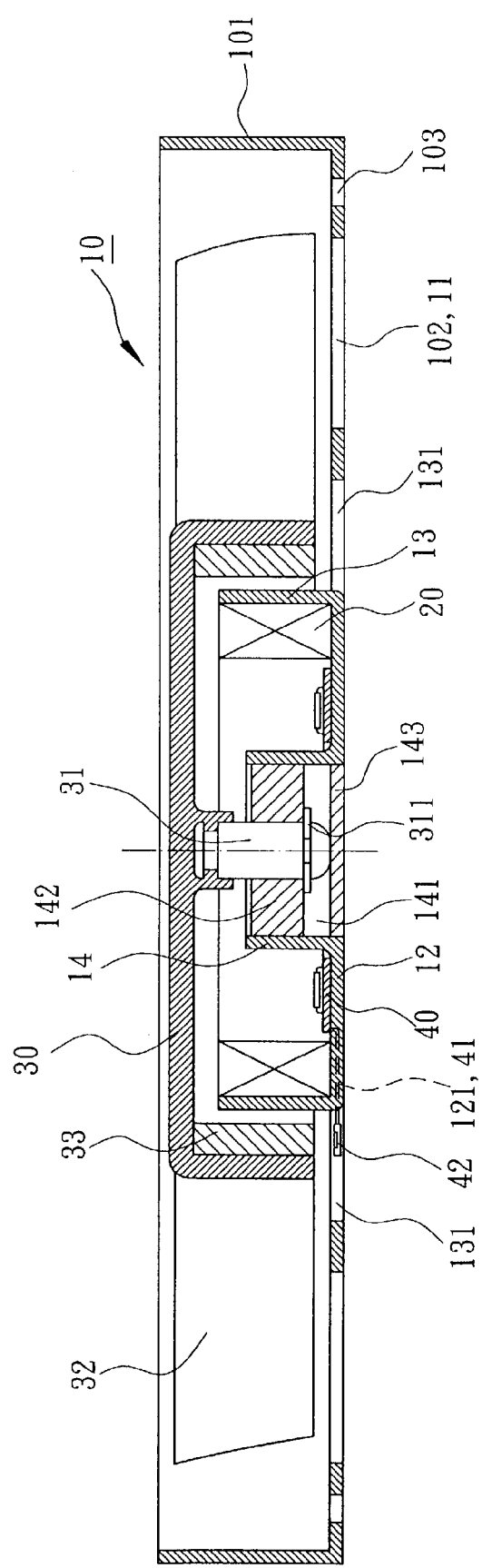
FIG. 3 is a sectional view taken along line 3—3 in FIG. 2.

Referring to FIGS. 1 through 3, a first embodiment of a casing for a heat-dissipating fan in accordance with the present invention comprises a casing 10 that is an integral member formed by means of punching a single magnetically conductive plate 1. The casing 10 after formation includes a bottom board 10*a* having a base 12 on a central portion thereof and a plurality of sidewalls 101 extending upwardly from a periphery of the bottom board, 10*a* with a plurality of air outlets 102 being defined in the bottom board 10*a* and surrounding the base 12. The base 12 is connected by a plurality of ribs 11 to the remaining portion of the bottom board 10*a*. The ribs 11 and the air outlets 102 are simultaneously formed during punching of the magnetically conductive plate 1.

Parts for a stator such as a coil assembly 20 and a circuit board 40 are mounted on the base 12. An axle tube 14 is mounted to a central portion of the base 12. Alternatively, the axle tube 14 is formed by means of punching; namely, the axle tube 14 is integral with the base 12. The coil assembly 20 and the circuit board 40 are mounted around the axle tube 14. Further, a plurality of magnetic pole faces 13 that are formed by means of punching the base 12 (see the holes 131 after punching), with the magnetic pole faces 13 being spaced by angular intervals around the an axial hole 141 defined in the axle tube 14. The magnetic pole faces 13 are adjacent to the coil assembly 20.

A bearing 142 is mounted in the axial hole 141 for rotatably holding a shaft 31 of a rotor 30. Also mounted in the axial hole 141 is a support member 143 on which a distal end of the shaft 31 of the rotor 30 rests, providing a stable rotation for the rotor 30. After the shaft 31 of the rotor 30 is extended through the bearing 142 and retained in place by a retainer 311, a permanent magnet 33 on the rotor 30 and the magnetic pole faces 13 of the base 12 have an appropriate radial gap therebetween. Thus, when the coil assembly 20 is energized under the control of the drive circuit (not labeled) on the circuit boar 40, alternating magnetic fields are created in the radial gap by the magnetic pole faces 13, thereby driving the rotor 30 and its blades 32 to turn.

Figure 4:
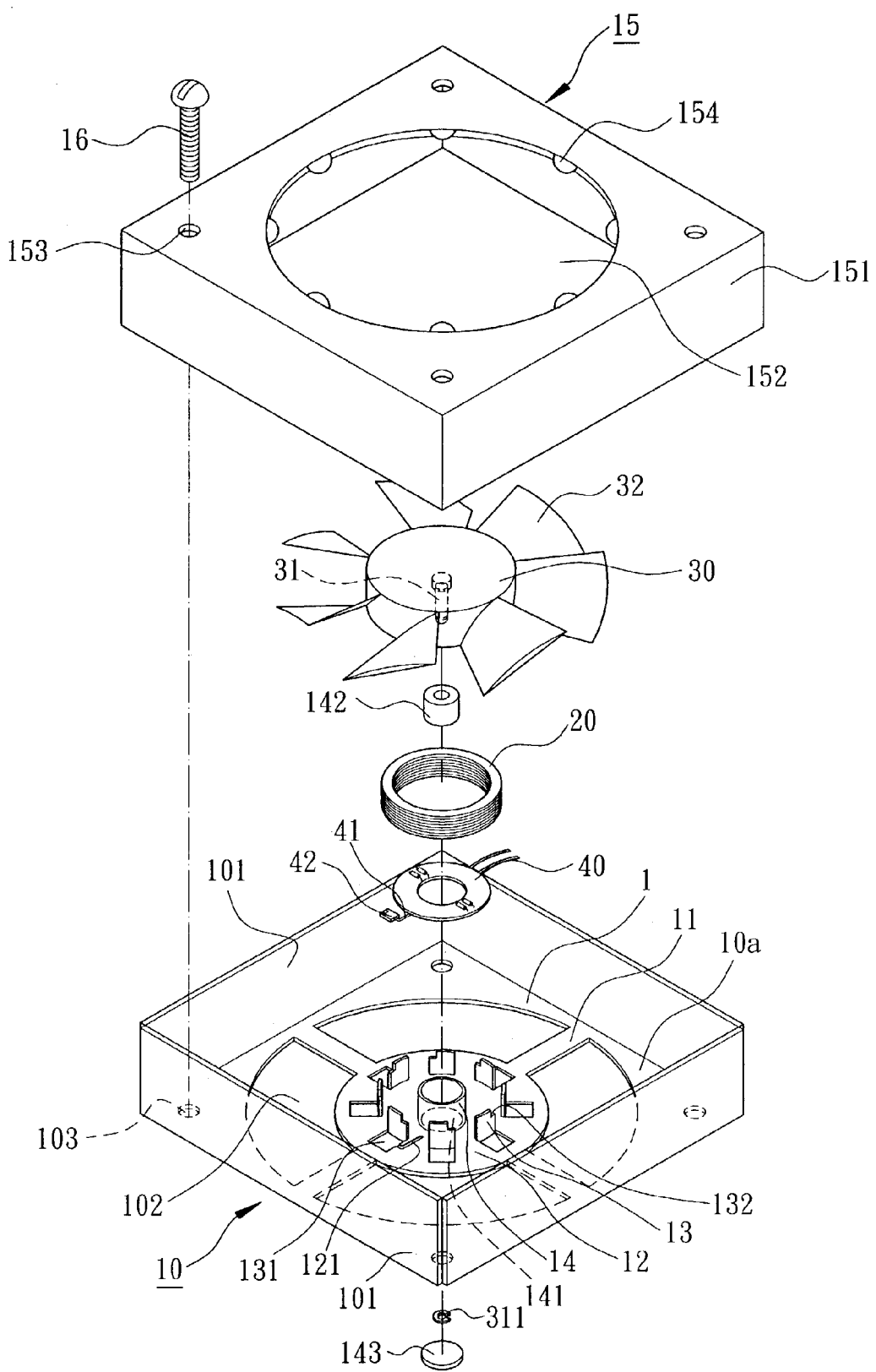
FIG. 4 is an exploded perspective view similar to FIG. 1, with an upper cover being attached to the heat-dissipating fan in FIG. 1.
Figure 5:
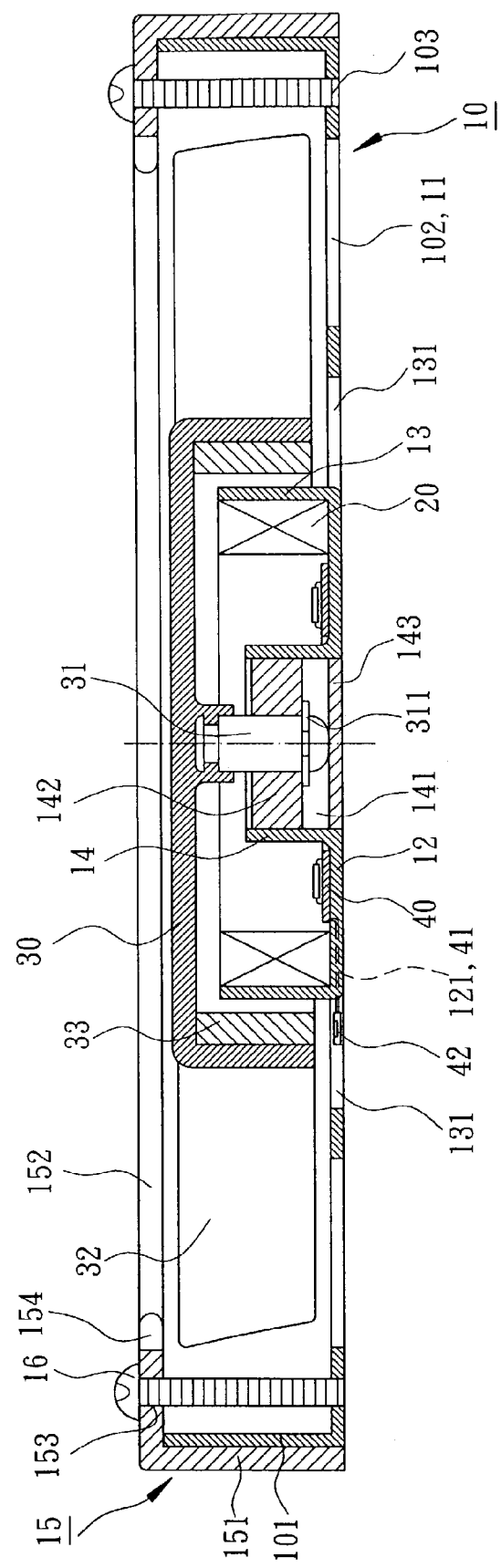
FIG. 5 is a sectional view of the heat-dissipating fan in FIG. 4.

As shown in FIGS. 4 and 5, an upper cover 15 is provided on top of the casing 10 for protecting the rotor 30. The upper cover 15 may be formed by molding injection, casting, or punching. Preferably, the upper cover 15 includes four sidewalls 151, an air inlet 152, a plurality of fixing holes 153, and a plurality of protrusions 154. The fixing holes 153 of the upper cover 15 are aligned with fixing holes 103 defined in the corner portions of the bottom board 10a of the casing 10, and fasteners 16 are extended through the fixing holes 153 and 103, thereby securing the upper cover 15 to the casing 10. The protrusions 154 project from an inner periphery delimiting the air inlet 152 for preventing inadvertent disengagement of the rotor 30 from the casing 10 without adversely affecting the air flow.

Referring to FIGS. 1 and 5, the base 12 may further include a slot 121 that is also formed as a result of punching. A wire 41 of the circuit board 40 extends in the slot 121 of the base 12. Thus, a sensor 42 on a distal end of the wire 41 can be mounted in an associated one of the holes 131. The sensor 42 is positioned adjacent to the permanent magnet 33 of the rotor 30 for detecting polarity of the permanent magnet 33. Further, a top of each magnetic pole face 13 may include a notch 132 of an appropriate shape. These notches 132 create non-uniform alternating magnetic fields while the power is turned on, thereby driving the rotor 30 and its blade 32. Thus, the heat-dissipating fan in accordance with the present invention is easy to start.

Figure 6:
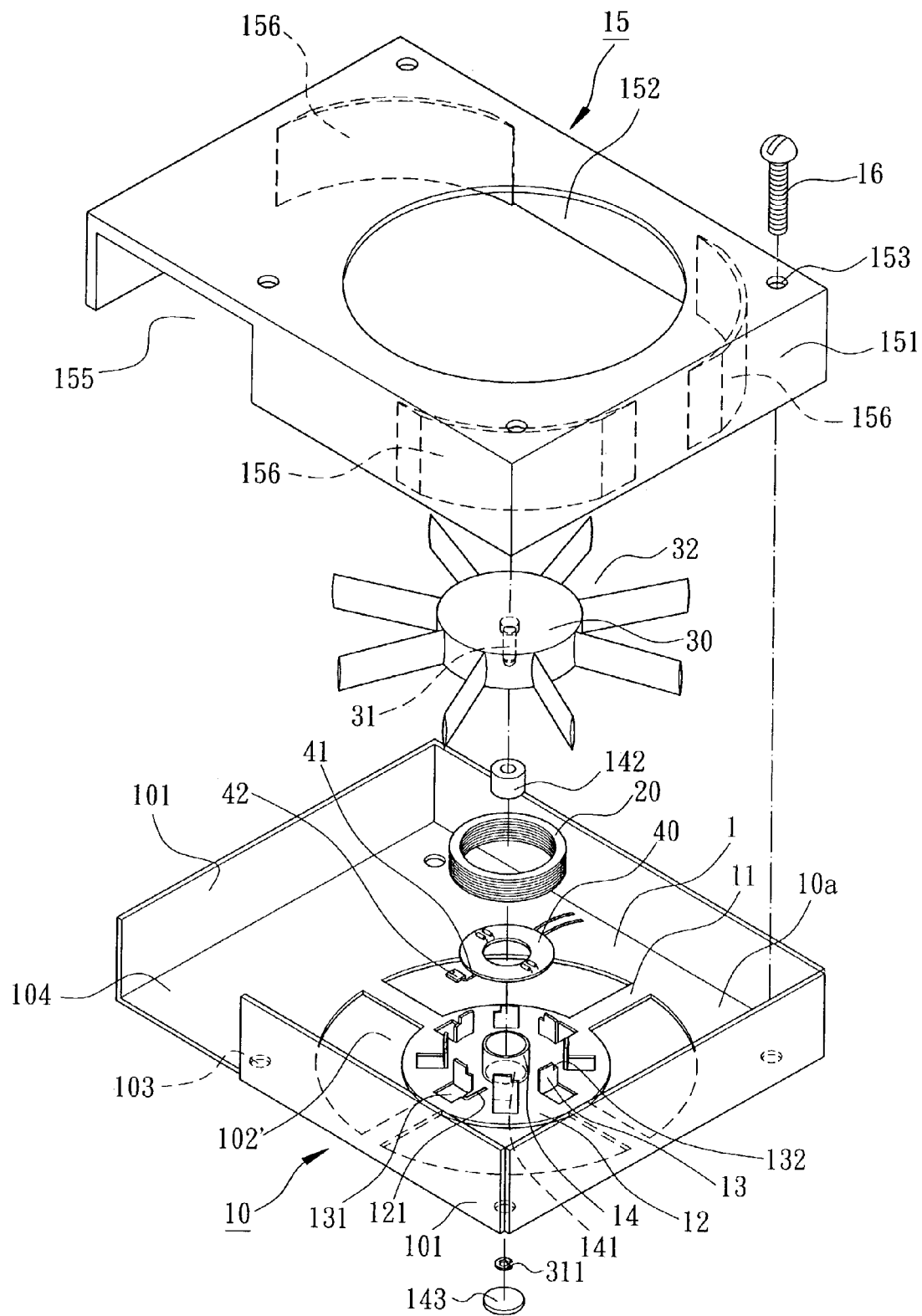
FIG. 6 is an exploded perspective of a modified embodiment of the heat-dissipating fan in accordance with the present invention.
Figure 7:
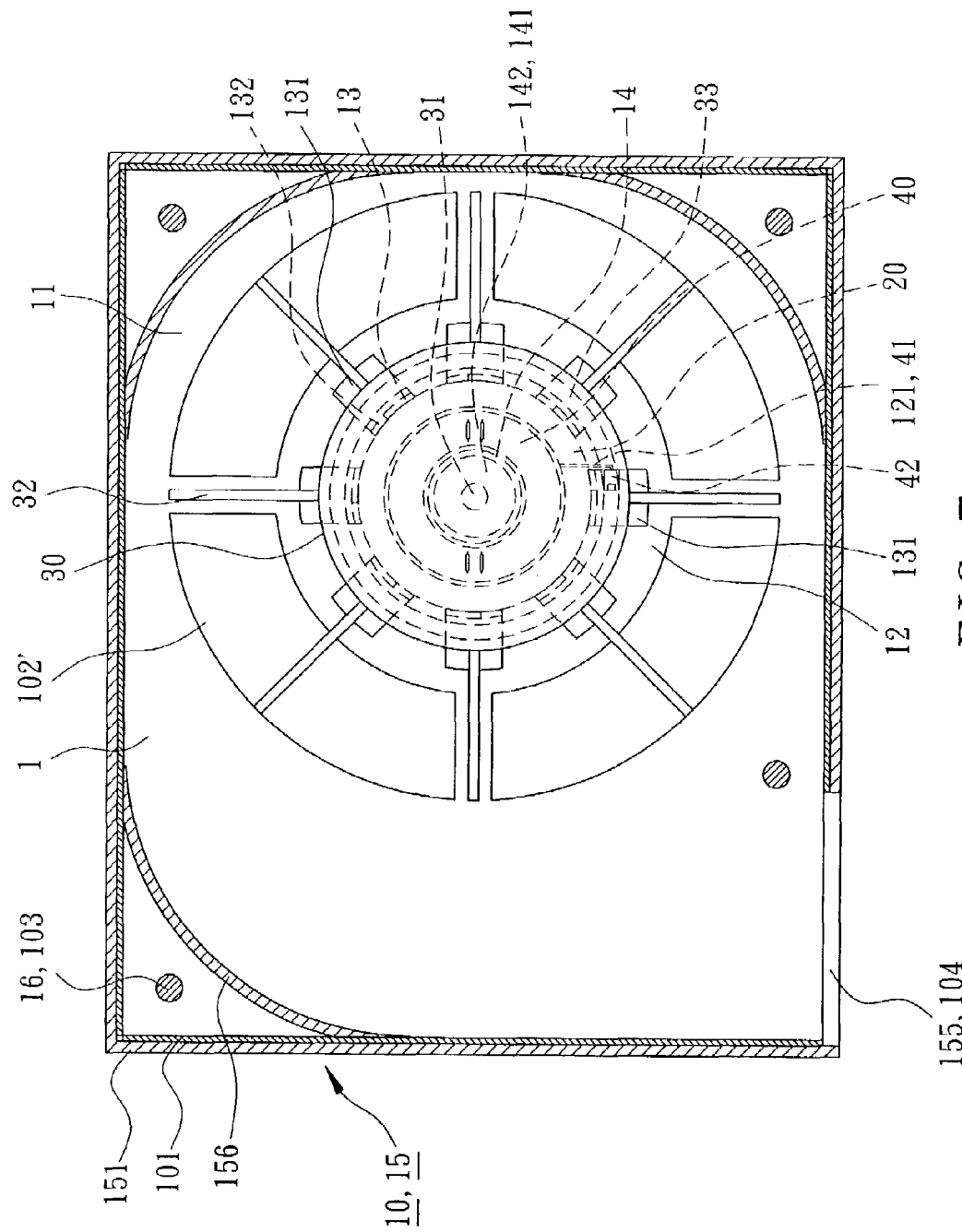
FIG. 7 is a sectional view of the heat-dissipating fan in FIG. 6.
Figure 8:
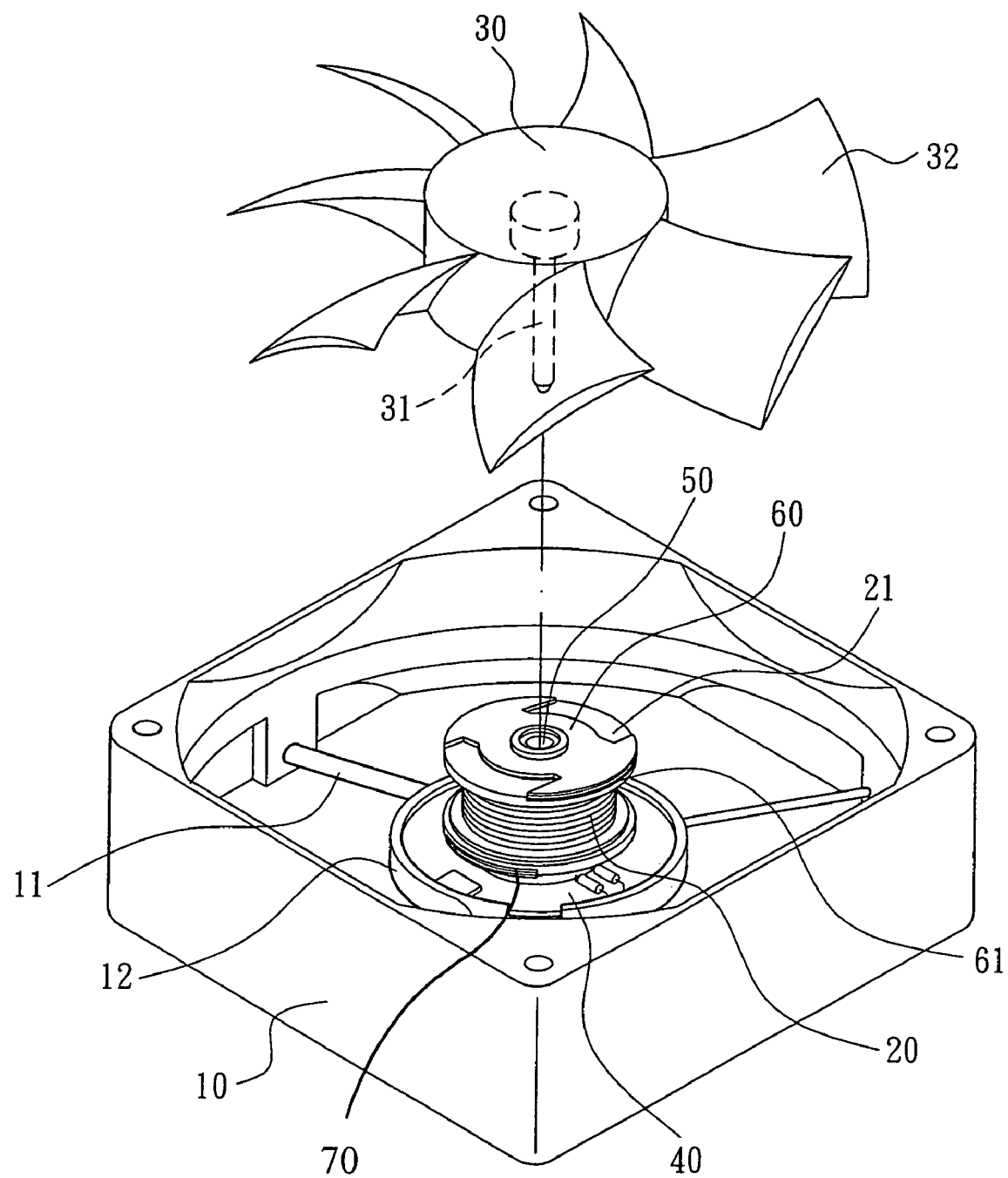
FIG. 8 is a perspective view, partly exploded, of a conventional heat-dissipating fan.

FIGS. 6 and 7 illustrate a second embodiment of the invention, wherein the casing 10 and the upper cover 15 are designed for a blower type heat-dissipating fan. More specifically, in this embodiment, the casing 10 is also an integral member formed by means of punching a single magnetically conductive plate 1. Nevertheless, space is preserved for providing a path for the air blown into the casing 10 while the rotor 30 drives winds for heat-dissipating purposes. Further, an air outlet 104 is defined in at least one of the sidewalls 101 of the casing 10. The upper cover 15 includes an air inlet 152 corresponding to the location of the rotor 30. An air outlet 155 is defined in one of the sidewalls 151 of the upper cover 15 and aligned with the air outlet 104 of the casing 10. Further, at least one guide plate 156 is formed on the corner portions of the sidewalls 151 of the upper cover 15 for guiding air and for preventing generation of turbulence. Further, holes 102' forming air inlets may be defined in the bottom board 10a of the casing 10 according to need.

As described above, a single magnetically conductive plate 1 is directly punched to form a casing 10 with the sidewalls 101, the ribs 11, the bottom board 10a with the base 12, the magnetic pole faces 13, and the axial hole 141, with the circuit board 40, the coil assembly 20, and the magnetic pole faces 13 being preferably arranged in a radial direction on the bottom board 10a. The number of the parts of the casing and the stator of the heat-dissipating fan and the overall thickness in the axial direction of the heat-dissipating fan are decreased without sacrificing the functions. Thus, the heat-dissipating fan and the casing 10 in accordance with the present invention can be used in notebook type computers as well as other delicate electronic devices.

While the principles of this invention have been disclosed in connection with specific embodiments, it should be understood by those skilled in the art that these descriptions are not intended to limit the scope of the invention, and that any modification and variation without departing the spirit of the invention is intended to be covered by the scope of this invention defined only by the appended claims.

What is claimed is:

1. A casing for a brushless dc motor of a heat-dissipating fan, the casing comprising a bottom board and a plurality of sidewalls extending from the bottom board, the bottom board and the sidewalls being integrally formed by punching a single magnetic conductive sheet to form a magnetically conductive plate, the bottom board including a base, with a stator having a coil assembly mounted on the base of the bottom board, with an axial hole being defined in an axle tube, with a bearing mounted in the axle tube for rotatably holding a shaft of a rotor, and with a plurality of magnetic pole faces formed on the bottom board by means of punching the single magnetic conductive sheet, with the magnetic pole faces surrounding the axial hole and being adjacent to the coil assembly of the stator, wherein said single magnetic conductive sheet is arranged to include a complete set of the pole faces for the brushless dc motor, said brushless dc motor including a single said pole plate and no other pole plates.

2. The casing for a heat-dissipating fan as claimed in claim 1, wherein the magnetic pole faces are spaced at angular intervals around the axial hole.

3. The casing for a heat-dissipating fan as claimed in claim 1, wherein a plurality of ribs and a plurality of air outlets are formed around the base of the bottom board by punching.

4. The casing for a heat-dissipating fan as claimed in claim 1, wherein the axial hole is defined by means of directly punching the base of the bottom board to form the axle tube.

5. The casing for a heat-dissipating fan as claimed in claim 1, wherein a notch is defined in each of the magnetic pole faces.

6. The casing for a heat-dissipating fan as claimed in claim 1, wherein the stator includes a circuit board.

7. The casing for a heat-dissipating fan as claimed in claim 6, wherein the circuit board includes a wire and a sensor attached to the wire, with the base of the bottom board including a slot through which the wire extends.

8. The casing for a heat-dissipating fan as claimed in claim 7, wherein the sensor is located in one of a plurality of associated holes that are formed during punching for forming the magnetic pole faces.

9. The casing for a heat-dissipating fan as claimed in claim 1, wherein a plurality of fixing holes is defined in corner portions of the casing.

10. The casing for a heat-dissipating fan as claimed in claim 1, wherein an upper cover is securely mounted on top of the casing.

11. The casing for a heat-dissipating fan as claimed in claim 10, wherein the upper cover includes an air inlet, with a plurality of protrusions projecting from an inner periphery delimiting the air inlet for preventing the rotor from disengaging from the casing.

12. The casing for a heat-dissipating fan as claimed in claim 10, wherein the upper cover includes a plurality of first fixing holes, with a plurality of second fixing holes being defined in corner portions of the bottom board of the casing and aligned with the first fixing holes of the upper cover, and with fasteners extending through the first fixing holes of the upper cover and the second fixing holes of the bottom board.

13. The casing for a heat-dissipating fan as claimed in claim 10, wherein the upper cover includes four sidewalls, with at least one of the sidewalls of the upper cover having an air outlet, with at least one of the sidewalls of the casing having an air outlet aligned with the air outlet of the upper cover.

14. The casing for a heat-dissipating fan as claimed in claim 1, wherein the upper cover further includes a plurality of sidewalls and a plurality of corner portions, with the upper cover having a guide plate on at least one of the corner portions thereof for guiding air.

15. A casing forming a single magnetic conductive plate for a single pole plate brushless dc motor, comprising:
- a bottom board formed by a single magnetic conductive sheet;
- sidewalls integrally extended from the bottom board of the single magnetic conductive sheet;
- a plurality of pole faces punched in the single magnetic conductive sheet to form the single magnetic conductive plate; and
- an axial hole formed at a center of the single magnetic conductive plate,
- wherein said single magnetic conductive sheet is arranged to include a complete set of the pole faces for the brushless dc motor, said brushless dc motor including a single said pole plate and not other pole plates.

16. The casing forming the single magnetic conductive plate for the single pole plate brushless dc motor as claimed in claim 15, wherein the magnetic pole faces are spaced at angular intervals around the axial hole.

17. The casing forming the single magnetic conductive plate for the single pole plate brushless dc motor as claimed in claim 15, wherein a plurality of ribs and a plurality of air outlets are formed in the bottom board of the of the single magnetic conductive sheet.

18. The casing forming the single magnetic conductive plate for the single pole plate brushless dc motor as claimed in claim 15, wherein the axial hole of the bottom board of the single magnetic conductive sheet integrally forms an axial tube.

19. The casing forming the single magnetic conductive plate for the single pole plate brushless dc motor as claimed in claim 15, wherein each of the magnetic pole faces forms a notch.

20. The casing forming the single magnetic conductive plate for the single pole plate brushless dc motor as claimed in claim 15, further comprising a circuit board.

21. The casing forming the single magnetic conductive plate for the single pole plate brushless dc motor as claimed in claim 20, wherein the circuit board includes a wire and a sensor connected therewith, while the bottom board of the single magnetic conductive sheet includes a slot through which the wire extends.

22. The casing forming the single magnetic conductive plate for the single pole plate brushless dc motor as claimed in claim 16, wherein the sensor is located in one of a plurality of associated holes that are punched to form the pole faces.

23. The casing forming the single magnetic conductive plate for the single pole plate brushless dc motor as claimed in claim 15, wherein corner portions of the casing define a plurality of fixing holes.

24. The casing forming the single magnetic conductive plate for the single pole plate brushless dc motor as claimed in claim 15, wherein an upper cover covers the casing.

25. The casing forming the single magnetic conductive plate for the single pole plate brushless dc motor as claimed in claim 24, wherein the upper cover includes an air inlet, with a plurality of protrusions projecting from an inner periphery delimiting the air inlet for preventing the rotor from disengaging from the casing.

26. The casing forming the single magnetic conductive plate for the single pole plate brushless dc motor as claimed in claim 24, wherein the upper cover includes a plurality of first fixing holes, while corner portions of the bottom board of the single magnetic conductive sheet include a plurality of second fixing holes which are aligned with the first fixing holes of the upper cover, and with fasteners extending through the first fixing holes of the upper cover and the second fixing holes of the bottom board.

27. The casing forming the single magnetic conductive plate for the single pole plate brushless dc motor as claimed in claim 24, wherein the upper cover includes four sidewall, with at least one of the sidewalls of the upper cover having a first air outlet, with at least one of the sidewalls of the casing having a second air outlet aligned with the first air outlet of the upper cover.

28. The casing forming the single magnetic conductive plate for the single pole plate brushless dc motor as claimed in claim 24, wherein the upper cover further includes a plurality of sidewalls and a plurality of corner portions, with the upper cover having a guide plate on at least one of the corner portions thereof for guiding air.

* * * * *